United States Patent
Rodriguez et al.

(10) Patent No.: US 12,272,204 B2
(45) Date of Patent: **\*Apr. 8, 2025**

(54) LATCHING ASSEMBLY FOR A PUSHBUTTON OF AN ELECTRONIC GAMING MACHINE

(71) Applicant: Aristocrat Technologies, Inc., Las Vegas, NV (US)

(72) Inventors: Frank Rodriguez, Las Vegas, NV (US); Lindsay McClintock, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,983

(22) Filed: Nov. 22, 2023

(65) Prior Publication Data

US 2024/0087401 A1 Mar. 14, 2024

Related U.S. Application Data

(63) Continuation of application No. 17/992,714, filed on Nov. 22, 2022, now Pat. No. 11,893,853, which is a (Continued)

(51) Int. Cl.
*G07F 17/32* (2006.01)
*A63F 13/90* (2014.01)

(52) U.S. Cl.
CPC ......... *G07F 17/3216* (2013.01); *A63F 13/90* (2014.09); *G07F 17/3241* (2013.01)

(58) Field of Classification Search
CPC ............ G07F 17/3202; G07F 17/3216; G07F 17/3209; A63F 13/90; G05G 1/02
See application file for complete search history.

(56) References Cited

U.S. PATENT DOCUMENTS

| 7,955,176 B2 | 6/2011 | Tastad |
| 8,012,027 B2 | 9/2011 | McGahn |

(Continued)

FOREIGN PATENT DOCUMENTS

| KR | 200406442 Y1 * | 1/2006 | ............ A63F 13/90 |
| KR | 20180086737 A | 8/2018 | |
| KR | 20190039530 A | 4/2019 | |

OTHER PUBLICATIONS

Office Action (Non-Final Rejection) dated Jun. 8, 2022 for U.S. Appl. No. 17/039,344 (pp. 1-12).

(Continued)

*Primary Examiner* — Jasson H Yoo
(74) *Attorney, Agent, or Firm* — Armstrong Teasdale LLP

(57) ABSTRACT

An electronic gaming machine includes a cabinet, a main display coupled to the cabinet and configured to display a wagering game, and a button deck assembly slidably coupled to the cabinet. The button deck assembly includes a housing extending from a first end oriented to face the cabinet to an opposed second end, a pushbutton releasably coupled to the housing between the first end and the second end, a latch, and a lever. The latch is configured to pivot relative to the pushbutton between a first position, in which the latch engages the pushbutton to secure the pushbutton to the housing, and a second position, in which the latch is disengaged from the pushbutton. The lever is slidably coupled to the housing and configured to engage the latch, wherein movement of the lever relative to the housing pivots the latch between the first position and the second position.

20 Claims, 16 Drawing Sheets

Related U.S. Application Data continuation of application No. 17/039,344, filed on Sep. 30, 2020, now Pat. No. 11,514,747.

(56) References Cited

U.S. PATENT DOCUMENTS

| | | | |
|---|---|---|---|
| 8,366,555 B2 | 2/2013 | McGahn | |
| 11,514,747 B2* | 11/2022 | Rodriguez | A63F 13/90 |
| 11,893,853 B2* | 2/2024 | Rodriguez | A63F 13/90 |
| 2020/0090462 A1* | 3/2020 | Tillery | A63F 13/90 |
| 2022/0171422 A1* | 6/2022 | Park | H01H 21/36 |

OTHER PUBLICATIONS

Office Action (Notice of Allowance and Fees Due (PTOL-85)) dated Sep. 16, 2022 for U.S. Appl. No. 17/039,344 (pp. 1-7).
Office Action (Notice of Allowance and Fees Due (PTOL-85)) dated Oct. 4, 2023 for U.S. Appl. No. 17/992,714 (pp. 1-10).

\* cited by examiner

LATCHING ASSEMBLY FOR A PUSHBUTTON OF AN ELECTRONIC GAMING MACHINE

CROSS-REFERENCE TO RELATED APPLICATIONS

The present application is a continuation of U.S. patent application Ser. No. 17/992,714, filed Nov. 22, 2022, which is a continuation of U.S. patent application Ser. No. 17/039,344, filed Sep. 30, 2020, and issued as U.S. Pat. No. 11,514,747, the disclosures of which are incorporated by reference herein in their entireties.

FIELD

The field of disclosure relates generally to electronic gaming, and more particularly, to a latching assembly for selectively coupling a pushbutton or other mechanism to an electronic gaming machine (EGM).

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

For game play itself, some known EGMs may include a button deck that is coupled to the cabinet of the EGM and is operable to receive player inputs thereon for play of the wagering game. At least some known button decks may include at least one mechanical pushbutton that is depressible on the button deck. Over the lifetime of the EGMs, the mechanical pushbuttons may be separated from the button deck, by an operator for example, to facilitate servicing and/or replacement of the pushbuttons. However, at least some known pushbuttons are fastened in an interior cavity of the button deck and require that significant portions of the button deck be disassembled by an operator before the pushbuttons may be removed. Moreover, at least some known button decks include manual releases for decoupling the push buttons. However, these releases are often positioned near the pushbutton and/or internally of the button decks, making them difficult for an operator to access. Accordingly, a button deck that includes a latching assembly which is easily accessible and allows for selectively releasing and/or securing a pushbutton to a button deck of an EGM is desirable.

BRIEF DESCRIPTION

In one aspect an electronic gaming machine is provided. The electronic gaming machine includes a cabinet, a main display coupled to the cabinet and configured to display a wagering game, and a button deck assembly slidably coupled to the cabinet. The button deck assembly includes a housing extending from a first end oriented to face the cabinet to an opposed second end, a pushbutton releasably coupled to the housing between the first end and the second end, a latch, and a lever. The latch is configured to pivot relative to the pushbutton between a first position, in which the latch engages the pushbutton to secure the pushbutton to the housing, and a second position, in which the latch is disengaged from the pushbutton to selectively remove the pushbutton from the housing. The lever is slidably coupled to the housing and configured to engage the latch, wherein movement of the lever relative to the housing pivots the latch between the first position and the second position.

In another aspect a button deck assembly for use with an electronic gaming machine having a cabinet is provided. The button deck assembly includes a sliding mechanism including a bracket and a rail slidably coupled to the bracket, the bracket configured to be coupled to the cabinet. The button deck assembly further includes a housing coupled to the rail and extending from a first end to an opposed second end, the housing moveable along an extension axis relative to the bracket, and a pushbutton releasably coupled to the housing between the first end and the second end. A latch is configured to pivot relative to the pushbutton between a first position, in which the latch engages the pushbutton to secure the pushbutton to the housing, and a second position, in which the latch is disengaged from the pushbutton to selectively remove the pushbutton from the housing. A lever is slidably coupled to the housing and configured to engage the latch, wherein movement of the lever relative to the housing pivots the latch between the first position and the second position.

DETAILED DESCRIPTION

The electronic gaming machine described herein may include a cabinet, a main display coupled to the cabinet and configured to display a wagering game, and a button deck assembly slidably coupled to the cabinet. The button deck assembly may include a housing and a pushbutton releasably coupled to the housing. The button deck assembly may further include a latch configured to pivot relative to the pushbutton between a first position, in which the latch engages the pushbutton to secure the pushbutton to the housing, and a second position, in which the latch is disengaged from the pushbutton to selectively remove the pushbutton from the housing. A lever may be slidably coupled to the housing and configured to engage the latch such that movement of the lever relative to the housing pivots the latch between the first position and the second position. Accordingly, embodiments of the electronic gaming machine described herein may facilitate detachably securing the pushbutton to the housing of a button deck assembly by hand operation (e.g., without requiring an operator to use tools to secure/detach the pushbutton to the housing).

Figure 1:
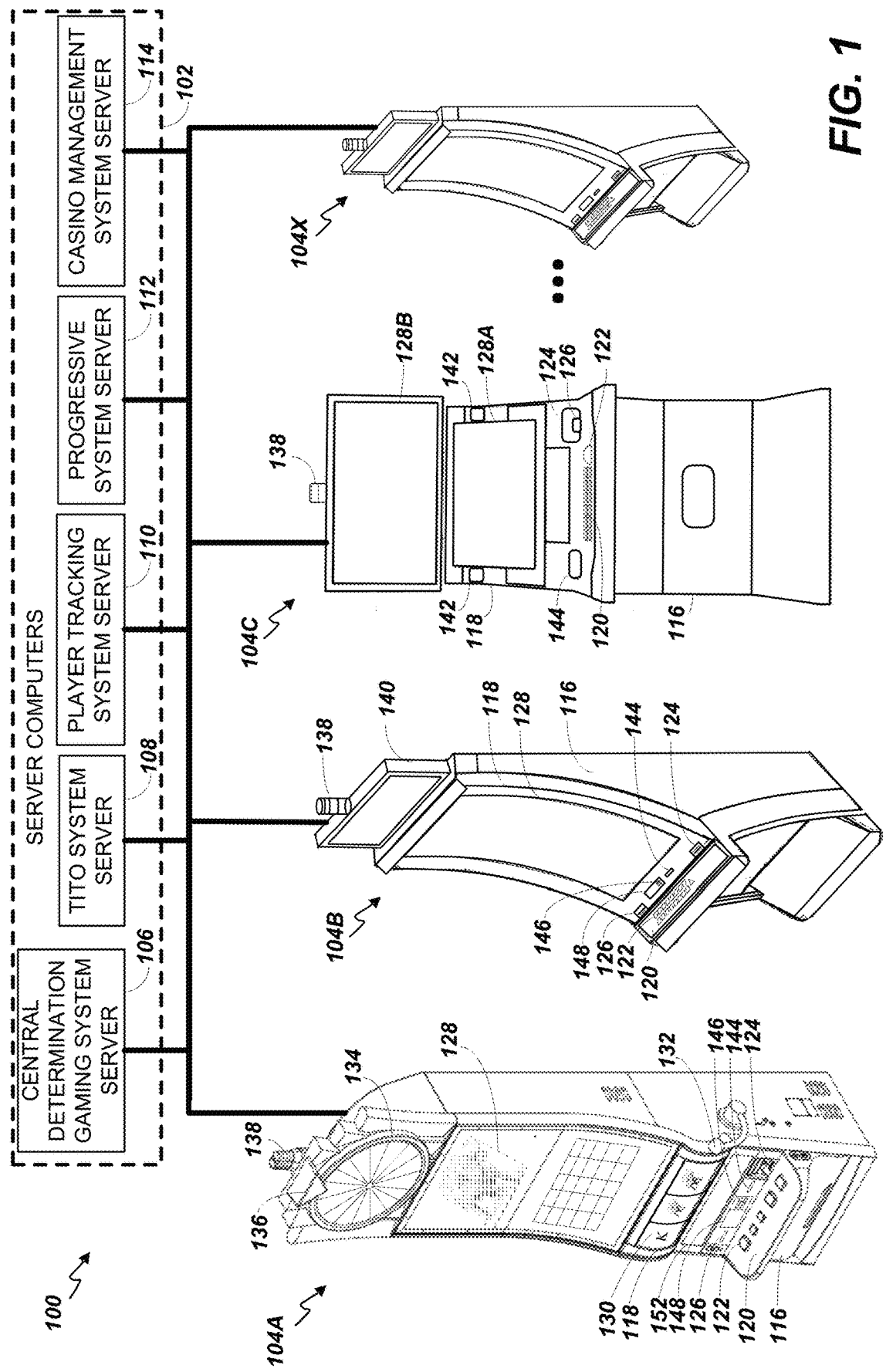
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
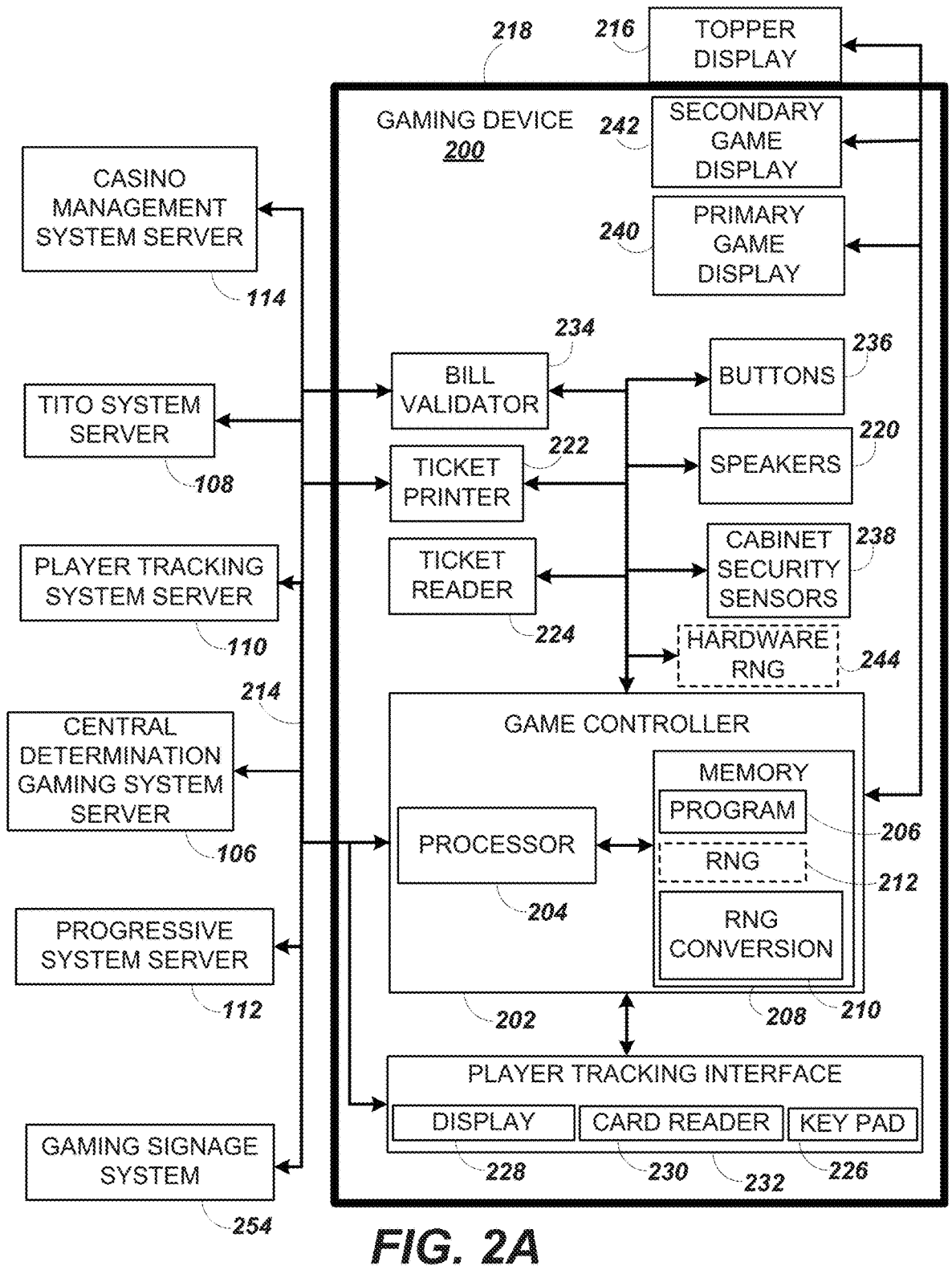
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS ° system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
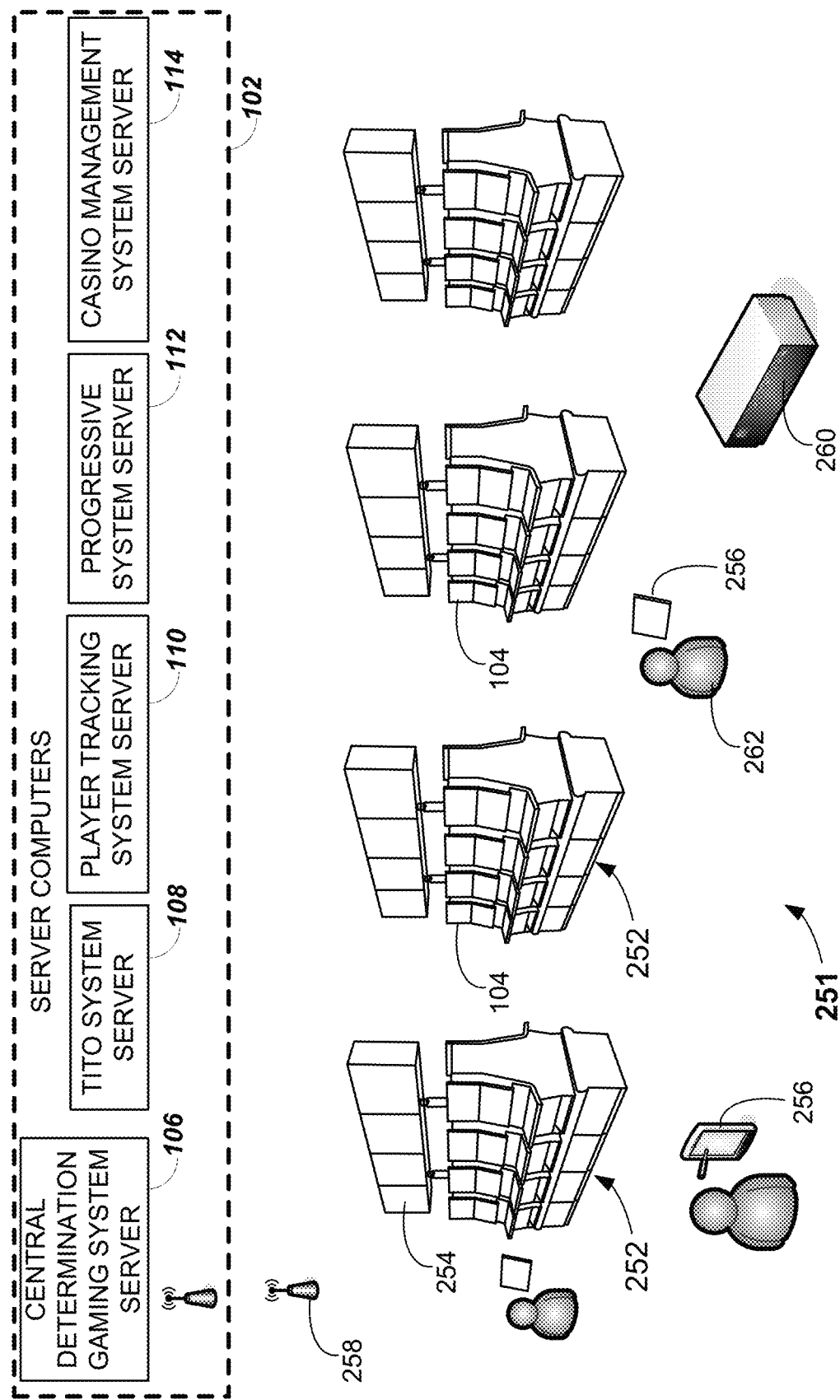
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
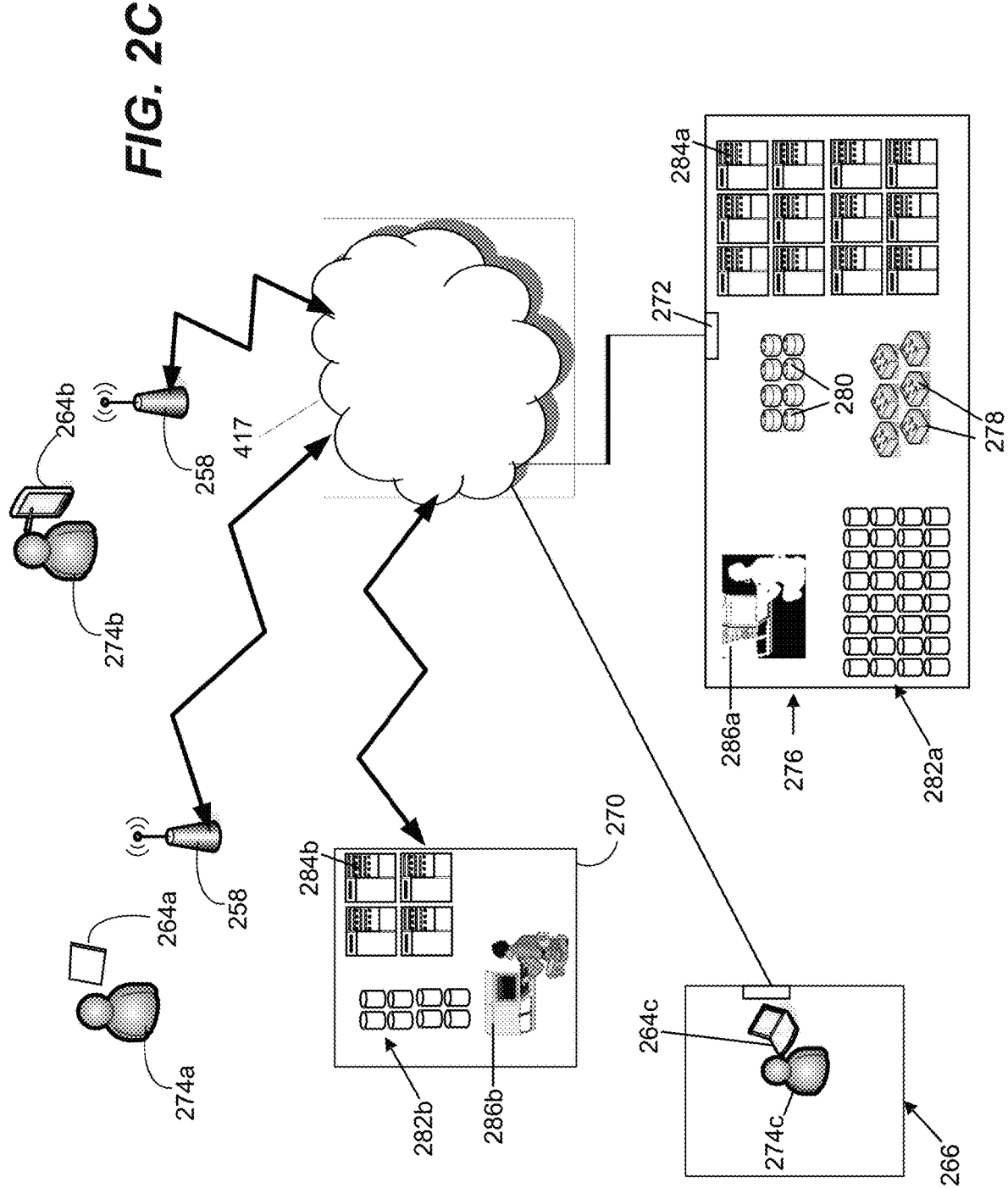
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
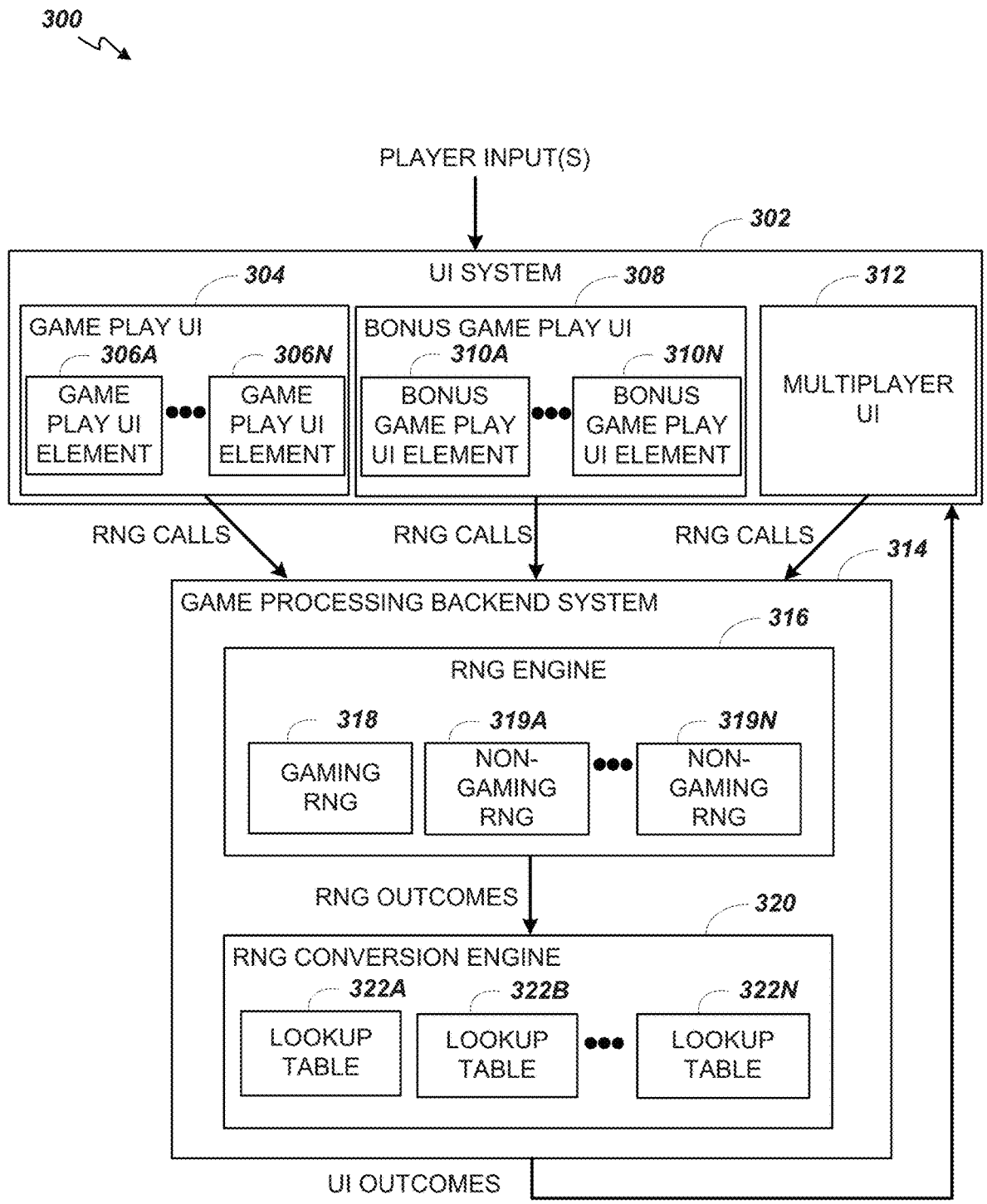
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
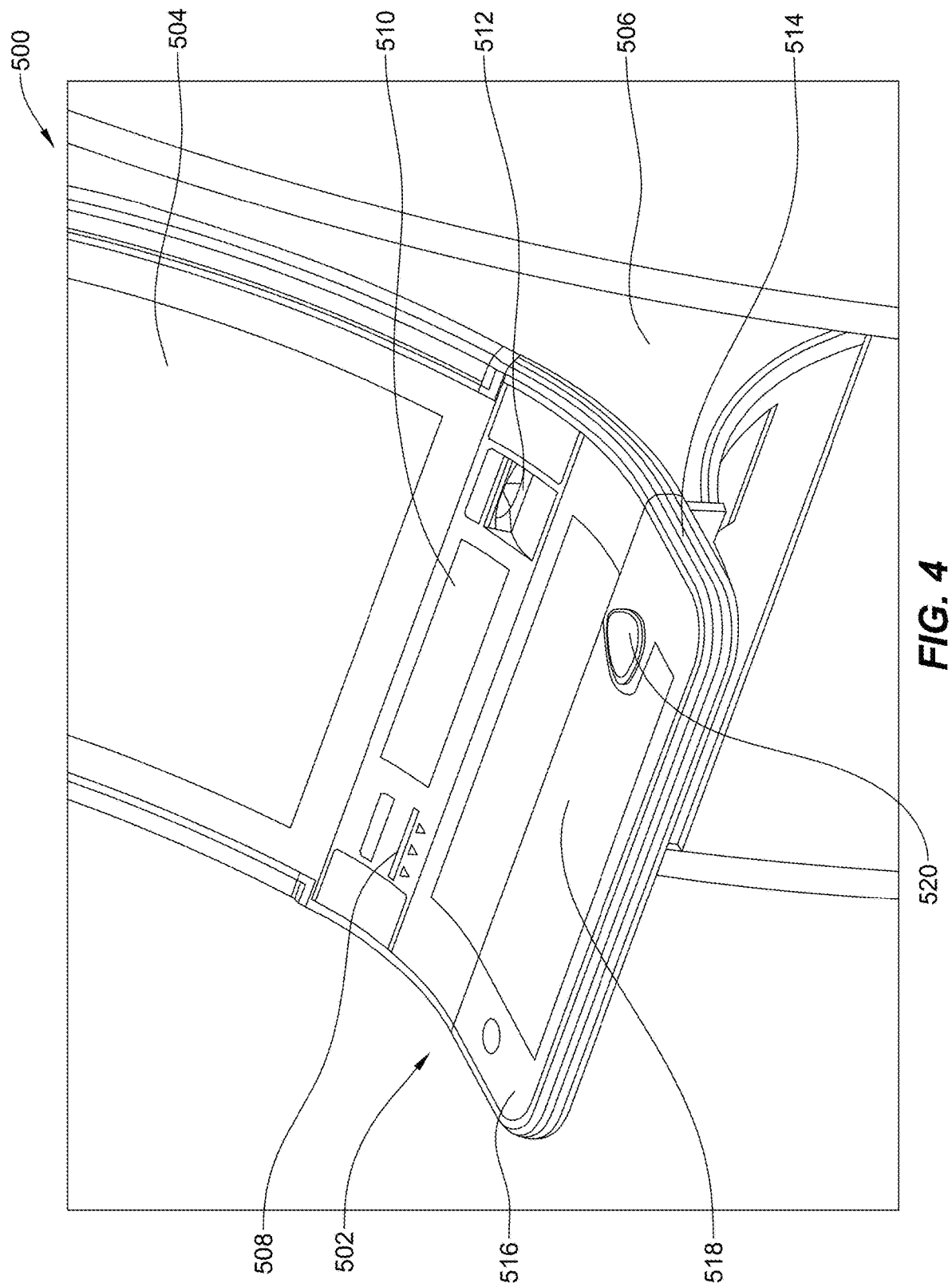
FIG. 4 is a perspective view of an exemplary electronic gaming machine, as shown in FIG. 1, including a button deck assembly in a closed position.
Figure 5:
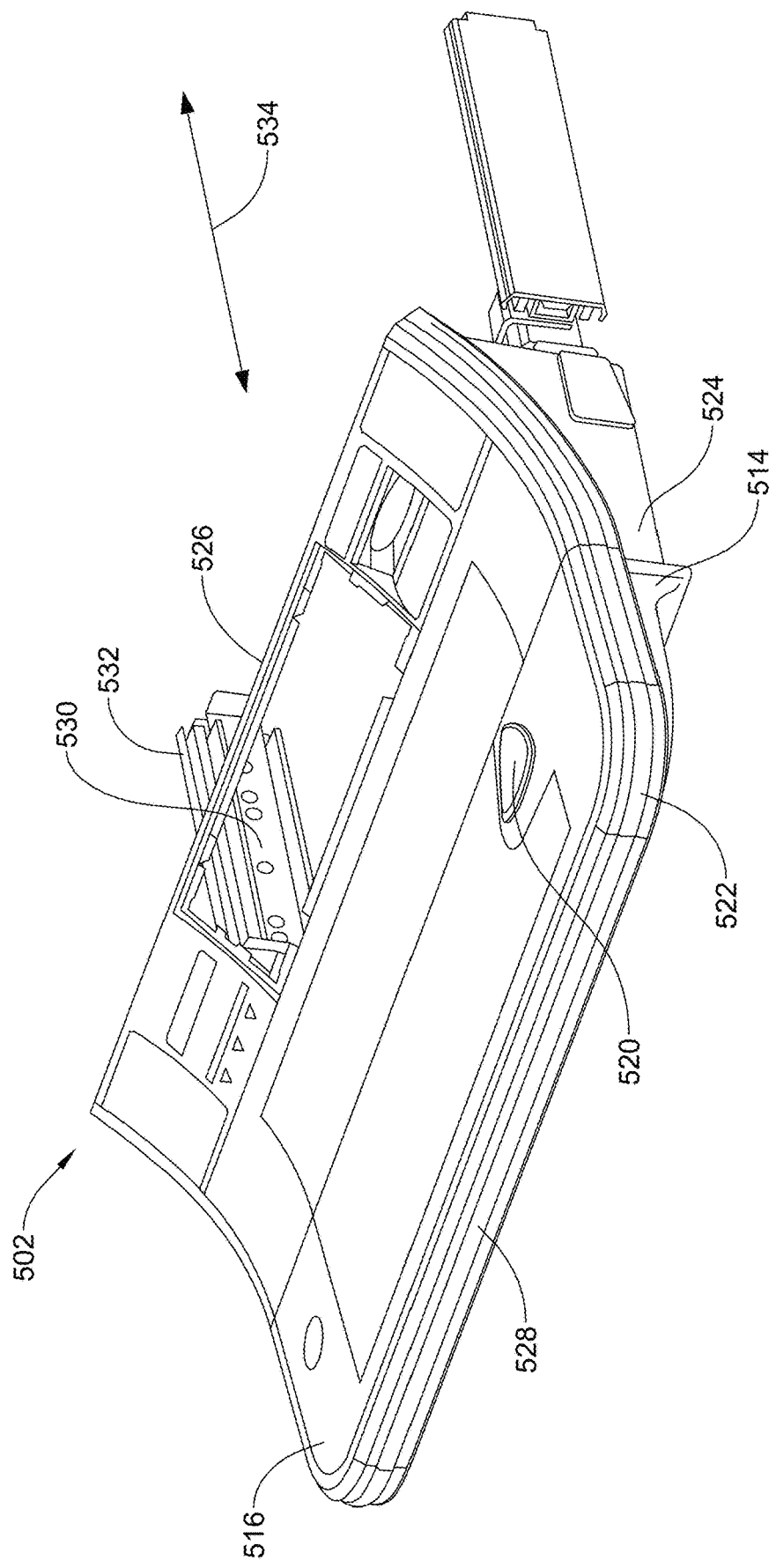
FIG. 5 is a perspective view of the button deck assembly shown in FIG. 4.
Figure 6:
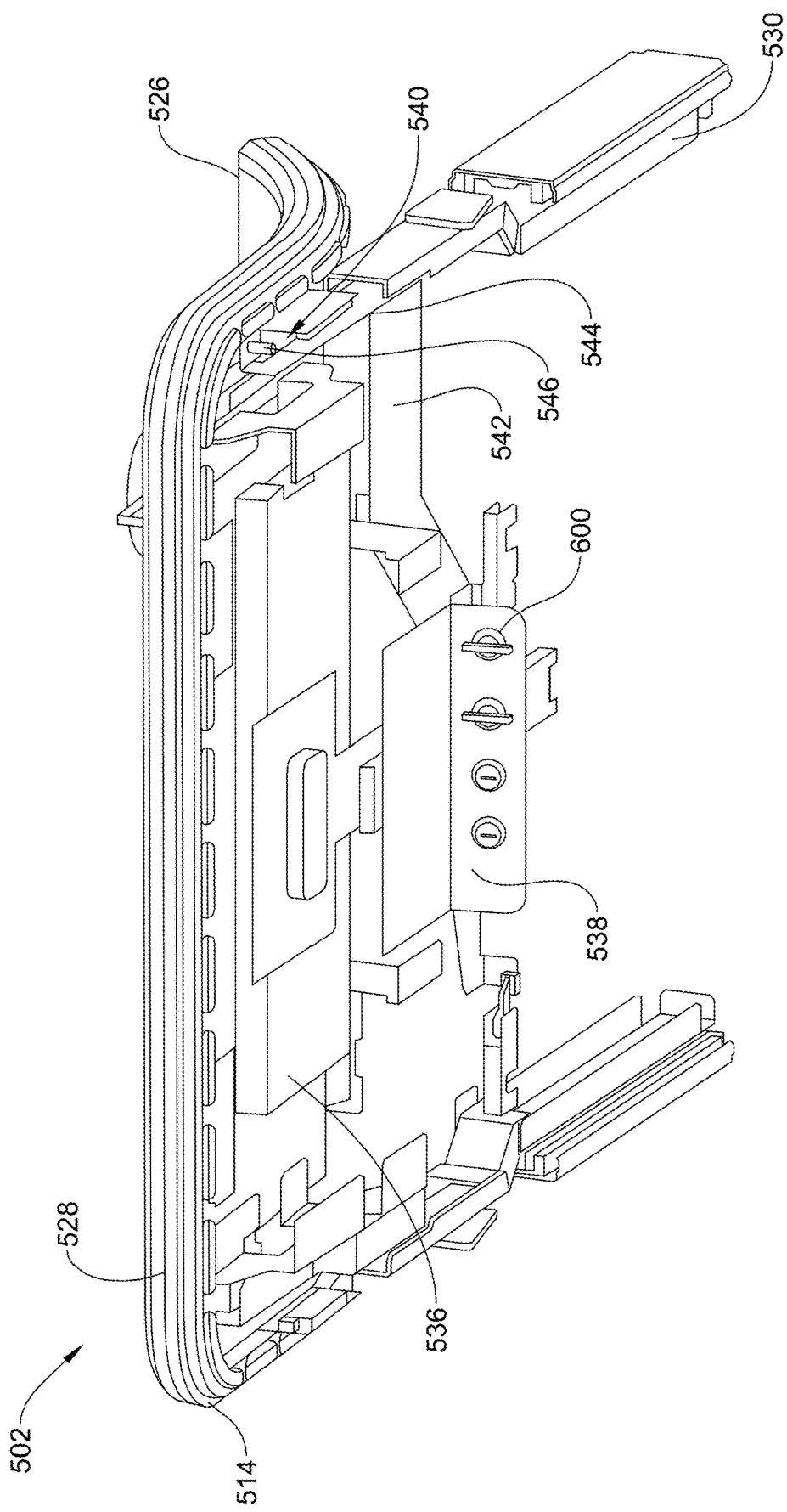
FIG. 6 is a bottom perspective view of the button deck assembly shown in FIG. 4.

FIG. 4 is a perspective view of an exemplary electronic gaming machine 500 including a button deck assembly 502 in a closed position. FIG. 5 is a perspective view of button deck assembly 502. FIG. 6 is a bottom perspective view of button deck assembly 502.

Referring to FIG. 4, in the example embodiment, electronic gaming machine 500 is similar to EGM 104B (shown in FIG. 1). That is, electronic gaming machine 500 does not include physical reels and instead includes a main display 504 configured to display a wagering game and coupled to a main cabinet 506. In the example embodiment, main display 504 is similar to main display 128 (shown in FIG. 1). In alternative embodiments, electronic gaming machine 500 includes any display that enables electronic gaming machine 500 to function as described herein.

In the example embodiment, electronic gaming machine 500 further includes a "ticket-out" printer 508 for outputting a credit ticket when a "cash out" button is pressed, an illuminated display 510 for reading, receiving, entering, and/or displaying player tracking information, and a bill validator 512. More specifically, in the example embodiment, ticket out printer 508, illuminated display 510, and bill validator 512 are each provided on a button deck assembly 502. In alternative embodiments, at least one of ticket out printer 508, illuminated display 510, and/or bill validator 512 are each provided on main cabinet 506.

In the example embodiment, button deck assembly 502 includes an exterior housing 514 having a table surface 516 and a video display 518 received within table surface 516. Video display 518 may be used, for example, as part of a player interface in the gaming machines and gaming systems described above. Video display 518 may be a liquid crystal display (LCD). Alternatively, another type of display video display such as cathode ray tube screen device, a light emitting diode (LED) display, an active-matrix organic light-emitting diode (AMOLED) display, a plasma screen display, a cathode ray tube screen device, or any other suitable video display unit providing an appropriate picture and resolution for the game being played may be used.

In the example embodiment, button deck assembly 502 further includes at least one dynamically configurable, mechanical pushbutton 520 (similar to or the same as buttons 122, shown in FIG. 1 on button deck 120). More specifically, in the example embodiment, button deck assembly 502 includes a single pushbutton 520 that is at least partially surrounded by video display 518. Accordingly, a player may generally interface with gaming machine 500 via the touch screen on video display 518 while pushbutton may be used to initiate a game (e.g., initiate a spin of digitally displayed reels) and/or receive any other player input. In alternative embodiments, button deck assembly 502 includes any number of pushbuttons that enable electronic gaming machine 500 to function as described herein. In some embodiments, button deck assembly 320 may be similar to button deck 120 (shown in FIG. 1) and may be installed within an EGM such as gaming devices 104A-104X.

Referring to FIG. 5, in the example embodiment, housing 514 includes an outer rim edge 522 extending around a perimeter of table surface 516 and a sidewall 524 depending from outer rim edge 522. In particular, outer rim edge 522 defines a first end 526 of housing 514 that is oriented to face cabinet 506 (shown in FIG. 4) and a second, opposed, end 528 of housing 514. In the example embodiment, button deck assembly 502 is configured to be coupled to cabinet 506 (shown in FIG. 4) such that outer rim edge 522 at first end 526 contacts cabinet 506 and sidewall 524 is received within an interior cavity (not shown) of cabinet 506. In particular, as shown in FIG. 4, in the example embodiment, outer rim edge 522 at first end 526 sits flush against cabinet 506 (shown in FIG. 4) when button deck assembly 502 is coupled to cabinet 506. In alternative embodiments, button deck assembly 502 is configured to be coupled to cabinet 506 in any manner that enables electronic gaming machine 500 to function as described herein.

In the example embodiment, housing 514 of button deck assembly 502 is slidably coupled to main cabinet 506 (shown in FIG. 4). In particular, in the example embodiment, button deck assembly 502 includes rails 530 that are slidably coupled to brackets 532. Brackets 532 are configured to be securely coupled to cabinet 506 (shown in FIG. 4). As a result, rails 530 and brackets 532 (broadly a "sliding mechanism") enable button deck assembly 502 to be moveable along an extension axis 534 between a closed position, in which housing 514 directly contacts cabinet 506 (shown in FIG. 4), to an open position (not shown), in which housing 514 is laterally spaced along extension axis 534 from cabinet 506. In some embodiments, rollers (not shown) may be positioned between rails 530 and brackets 532 to reduce frictional interaction between brackets 532 and rails 530 when housing 514 is moved relative to brackets 532.

Referring to FIG. 6, sidewall 524 (shown in FIG. 5) is removed to reveal the internal construction of button deck assembly 502. In the example embodiment, housing 514 includes a frame 536 depending from housing 514 configured to hold various electronic components (not shown) of button deck assembly 502 therein. A locking assembly 538 depends from frame 536 and is configured to facilitate locking button deck assembly 502 in the closed position. In some embodiments, locking assembly 538 may be covered by an access door (not shown) to permit operator access to locking assembly 538 when button deck assembly 502 is in the closed position.

In the example embodiment, a latching assembly 540 is coupled to button deck assembly 502 for releasably coupling pushbutton 520 (shown in FIG. 5) to button deck assembly 502. Latching assembly 540 includes a lever 542 positioned, at least in part behind (i.e., into the page in FIG. 6) first end 526 of housing 514. Lever 542 includes an arm 544 that extends between rails 530 and engages a latch 546 of latching assembly 540. In the example embodiment, latch 546 is coupled to pushbutton 520 (shown in FIG. 5) and configured to pivot relative to pushbutton 520 to facilitate selectively securing and releasing pushbutton 520 relative to housing 514. In the example embodiment, lever 542 is configured to be moved relative to housing 514 of button deck assembly 502 to facilitate unlatching latch 546. Lever 542 is also configured to be engaged with locking assembly 538 to facilitate locking lever 542 in position relative to latch 546, thereby inhibiting release of pushbutton 520. In the example embodiment, locking assembly 538 further inhibits movement of lever 542 relative to latch 546 when button deck assembly 502 is in the closed position and is moved to the extended position.

Figure 7:
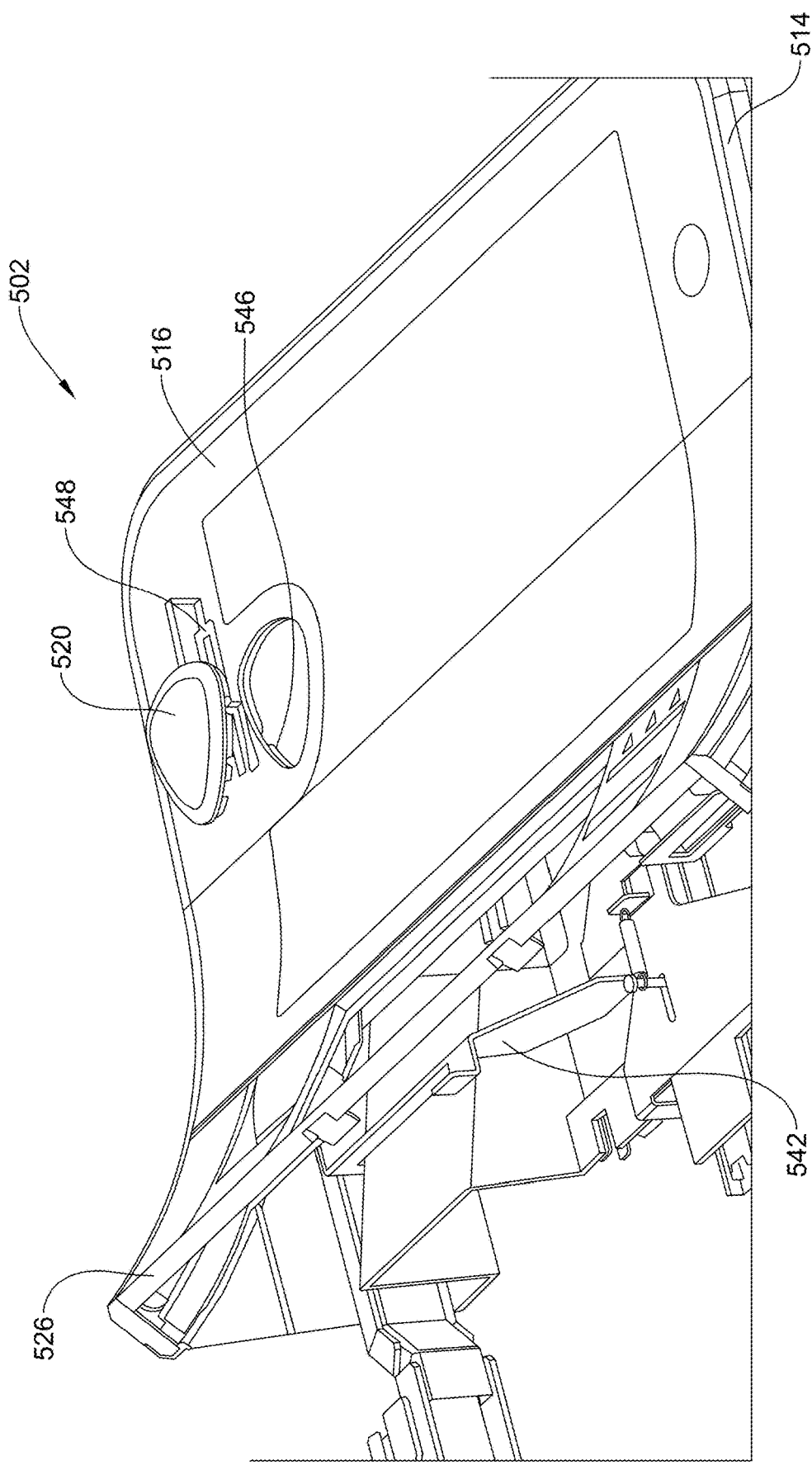
FIG. 7 is a perspective view of the button deck assembly shown in FIG. 4 including a pushbutton released from the button deck assembly.

FIG. 7 is a perspective view of button deck assembly 502 showing pushbutton 520 released from button deck assembly 502. In the example embodiment, during operation, once button deck assembly 502 is moved to the extended position, an operator may move lever 542 away from first end 526 of housing 514 (e.g., generally leftward in FIG. 7) to cause latch 546 to pivot relative to pushbutton 520 and release pushbutton 520. As is shown in FIG. 7, pushbutton 520 may then be lifted upward from housing 514, or, more specifically, table surface 516, of button deck assembly 502, to separate pushbutton 520 from button deck assembly 502. In alternative embodiments, button deck assembly 502 may include a biasing mechanism, e.g., a spring (not shown) that engages pushbutton 520 and applies a force on pushbutton 520 to lift pushbutton 520 relative to housing 514 when latch 546 is pivoted and pushbutton 520 is released.

In the example embodiment, pushbutton 520 also includes a wired connector 548, that is configured to be coupled to an internal connector (not shown) within button deck assembly 502. Wired connector 548 enables pushbutton 520 to be communicatively coupled with various electronic components (e.g., a processor) of button deck assembly 502. In the example embodiment, to remove pushbutton 520, wired connector 548 may first be uncoupled from the internal connector (not shown) prior to lifting pushbutton 520 from button deck assembly 502. In alternative embodiments, pushbutton 520 is configured to be communicatively coupled to internal components (not shown) of button deck assembly 502 in any manner that enables pushbutton 520 to function as described herein.

Figure 8:
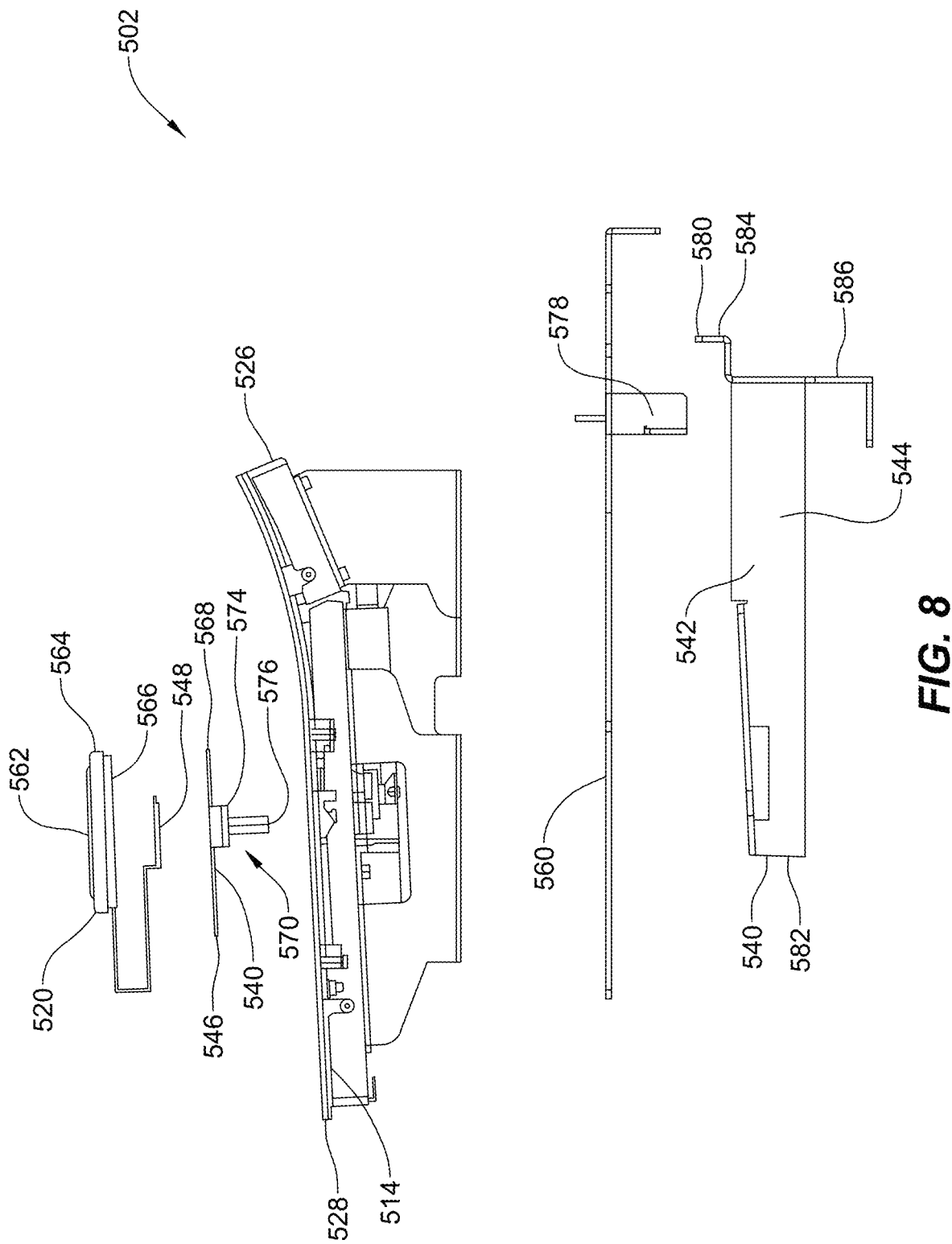
FIG. 8 is an exploded view of the button deck assembly shown in FIG. 4.
Figure 9:
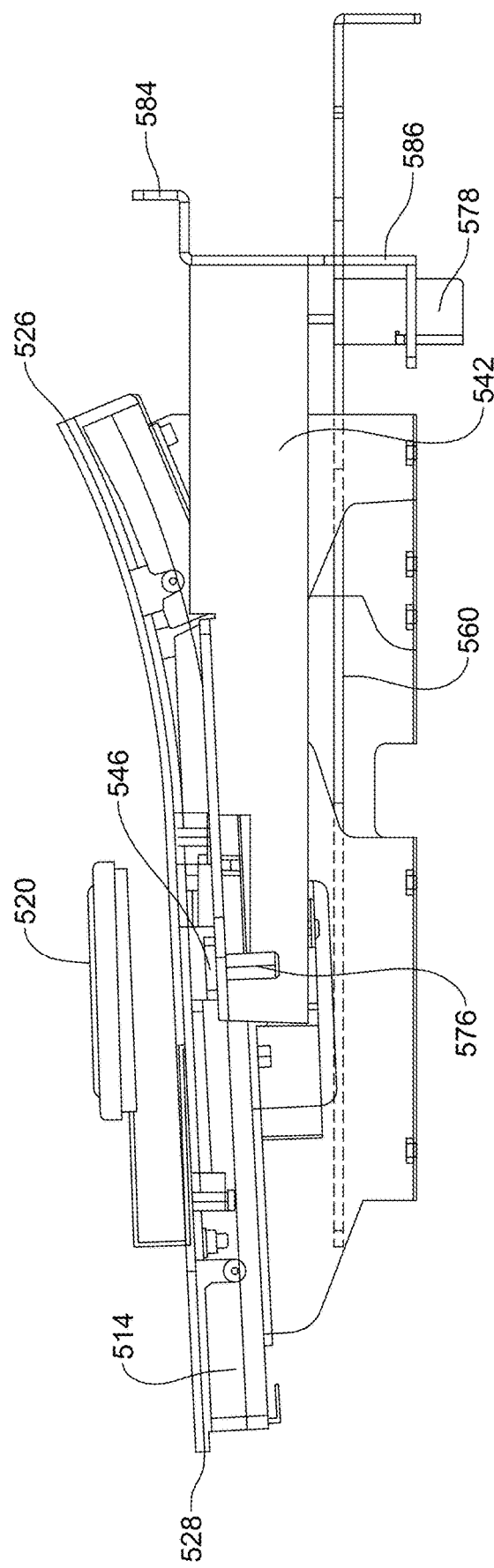
FIG. 9 is a side view of the of the button deck assembly shown in FIG. 4.

FIG. 8 is an exploded view of button deck assembly 502. FIG. 9 is a side view of button deck assembly 502. In the example embodiment, button deck assembly 502 includes pushbutton 520, latch 546, housing 514, a blocking bar 560, and lever 542. As described herein, latch 546 and lever 542 collectively form a latching assembly 540 that is configured to releasably couple pushbutton 520 to housing 514.

In the example embodiment, pushbutton 520 includes a button 562, a bezel 564 surrounding button 562, and a lower rim 566. Button 562 is selectively depressible relative to bezel 564 and is operable to receive an input from a player during the wagering game by being depressed relative to bezel 564. In the example embodiment, lower rim 566 is coupled to bezel 564 and depends therefrom. In particular, in the example embodiment, a least a portion of lower rim 566 is circumscribed by bezel 564. Wired connector 548 is coupled to lower rim 566 and is configured to transmit one or more signals to various electronic components (not shown) of button deck assembly 502 indicating when button 562 is pressed.

In the example, latch 546 includes a latch rim 568 and a pivot member 570 coupled to and depending from latch rim 568. Latch rim 568 defines an aperture 572 (shown in FIG. 10) that is sized to receive at least a portion of pushbutton 520. More specifically, in the example embodiment, latch rim 568 is sized to circumscribe lower rim 566 of pushbutton 520 such that lower rim 566 of pushbutton 520 may be received within aperture 572 to selectively couple pushbutton 520 to latch 546. In alternative embodiments, latch 546 is configured to engage pushbutton 520 in any manner that enables latch 546 to function as described herein. In the example embodiment, latch rim 568 is pivotably coupled to housing 514. In alternative embodiments, latch 546 is coupled to housing 514 in any manner that enables latch 546 to function as described herein.

In the example embodiment, pivot member 570 includes a bridge 574 and a plug 576. Bridge 574 couples plug 576 to latch rim 568. More specifically, in the example embodiment, bridge 574 extends radially outward from latch rim 568 (e.g., out of the page in FIG. 8) and plug 576 extends transversely relative to latch rim 568 (e.g., downward in FIG. 8). As a result, as shown in FIG. 9, during operation, when lever 542 is engaged with latch 546 and latch 546 is engaged with pushbutton 520, lateral movement of lever 542, or more specifically, lateral movement of a handle 584 of lever 542, away from first end 526 of housing 514 (e.g., to the right in FIGS. 8 and 9), causes plug 576 to move laterally relative to housing 514, thereby pivoting latch rim 568 circumferentially about lower rim 566 from a first position, in which latch 546 secures pushbutton 520 to housing 514, to a second position, in which latch 546 is disengaged from pushbutton 520. Accordingly, in the example embodiment, pivoting of latch rim 568 relative to pushbutton 520 enables selective removal of pushbutton 520 from housing 514.

In the example embodiment, blocking bar 560 is slidably coupled to housing 514 and is configured to move laterally (e.g., from left to right of the page as shown in FIG. 9) relative to housing 514. In particular, blocking bar 560 includes a foot plate 578 that is engaged with lever 542 such that lateral movement of lever 542 relative to housing 514 drives lateral movement of blocking bar 560 with lever 542. Blocking bar 560 may be slidably coupled to housing 514 via one or more rollers (not shown). In the example embodiment, as described in greater detail below with respect to FIGS. 11-14, blocking bar 560 facilitates selectively locking lever 542 in position relative to housing 514. In alternative embodiments, button deck assembly 502 does not include blocking bar 560.

Referring back to FIG. 8, in the example embodiment, lever 542 extends laterally between a first end 580 and a second end 582. Lever 542 includes a handle 584 that is positioned at first end 580 and arm 544 extends laterally from handle 584 to second end 582. As shown in FIG. 9, in the example embodiment, handle 584 extends beyond first end 526 of housing 514 such that first end 526 of housing is positioned between handle 584 and second end 528. Accordingly, during operation, when button deck assembly 502 is moved to the extended position, handle 584 is exposed between first end 526 and cabinet 506 (shown in FIG. 4), enabling an operator to easily access handle 584 by reaching over button deck assembly 502. In the example embodiment, lever 542 further includes a leg 586 positioned at first end 580 and depending from handle 584 below arm 544. In particular, in the example embodiment, leg 586 is configured to engage foot plate 578 of blocking bar 560. In alternative embodiments, lever 542 engages blocking bar 560 in any manner that enables lever 542 to function as described herein.

Figure 10:
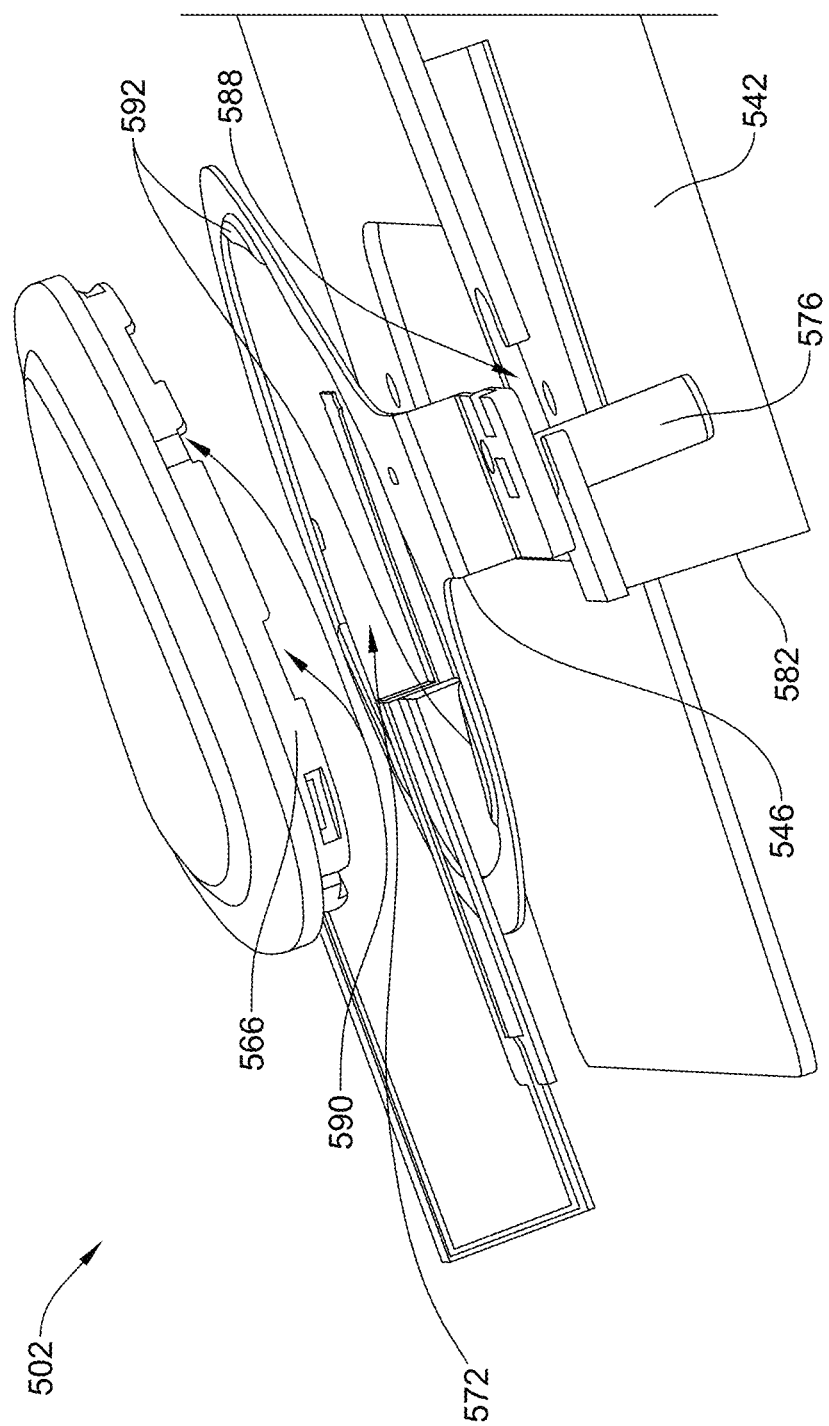
FIG. 10 is an exploded perspective view of a portion of the button deck assembly shown in FIG. 4.

FIG. 10 is an exploded perspective view of a portion of button deck assembly 502. In the example embodiment, lever 542 defines a slot 588 proximate second end 582. Plug 576 of latch 546 is received within slot 588 to couple latch 546 to lever 542 and to facilitate pivoting latch rim 568 relative to lower rim 566, as described above with respect to FIG. 8. In alternative embodiments, lever 542 is coupled to latch 546 in any manner that enables button deck assembly 502 to function as described herein.

In the example embodiment, latch rim 568 and lower rim 566 each include a plurality of cam features 590, 592 that facilitate selectively coupling latch rim 568 to lower rim 566. More specifically, in the example embodiment, lower rim 566 defines a plurality of grooves 590 and latch rim 568 includes a plurality of projections 592. Grooves 590 and projections 592 are sized and positioned on lower rim 566 and latch rim 568, respectively, in correspondence with one another. In particular, latch projections 592 are sized to engage grooves 590 by positioning pushbutton 520 relative to latch 546 such that grooves 590 are each aligned with corresponding projections 592 on latch rim 568. Once grooves 590 and projections 592 are aligned, one of pushbutton 520 and latch 546 may be rotated relative to the other such that projections 592 secure lower rim 566 to latch rim 568. In alternative embodiments, cam features 590, 592 include a plurality of projections 592 and grooves 590 on both latch rim 568 and lower rim 566. In the example embodiment, latch aperture 572 is sized to receive lower rim 566 therein. In alternative embodiments, pushbutton 520 is configured to be coupled to latch 546 in any manner that enables latching assembly 540 to function as described herein.

Figure 11:
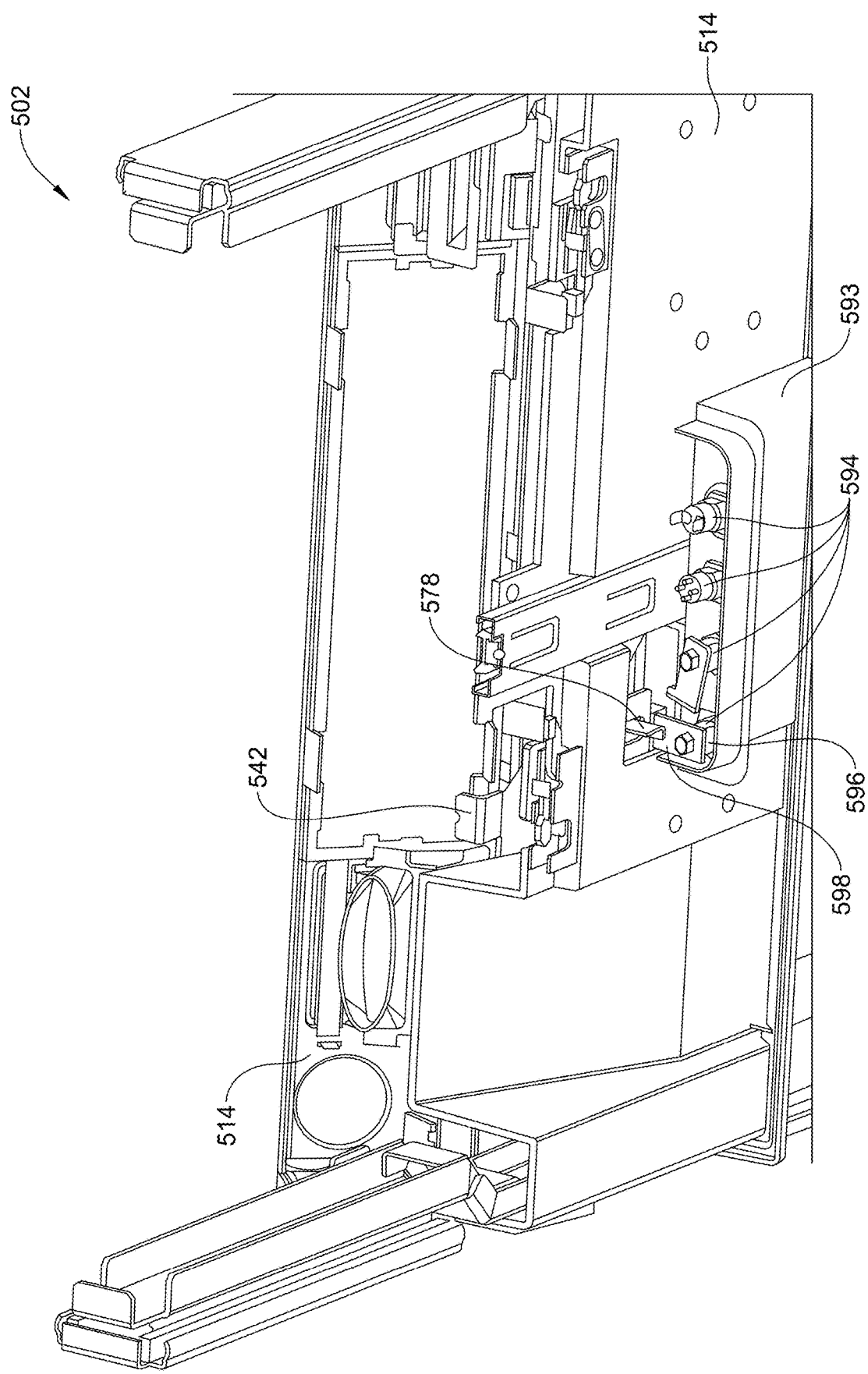
FIG. 11 is a rear perspective view of the button deck assembly shown in FIG. 4.
Figure 12:
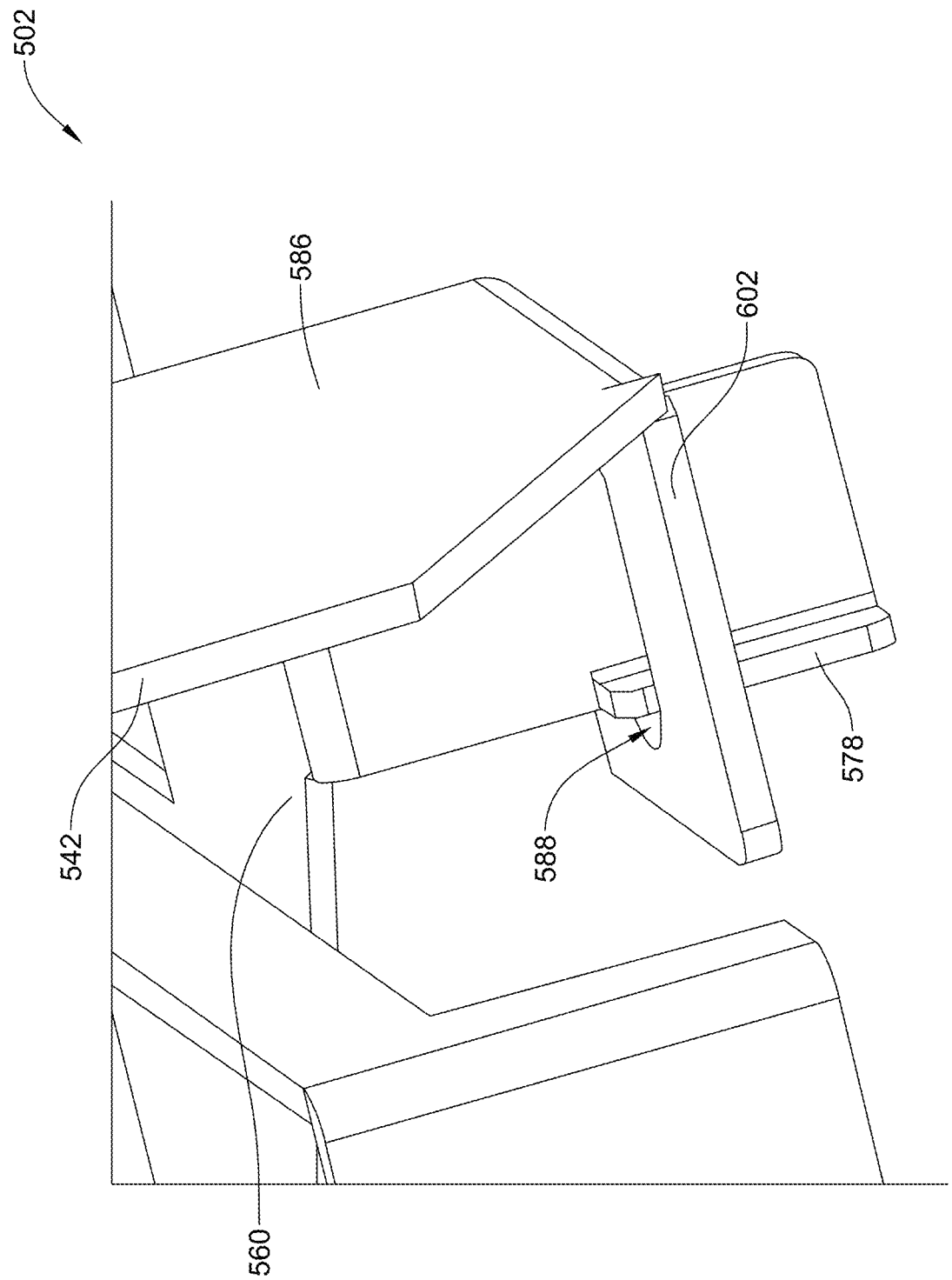
FIG. 12 is an enlarged view of a portion of the button deck assembly shown in FIG. 4.
Figure 13:
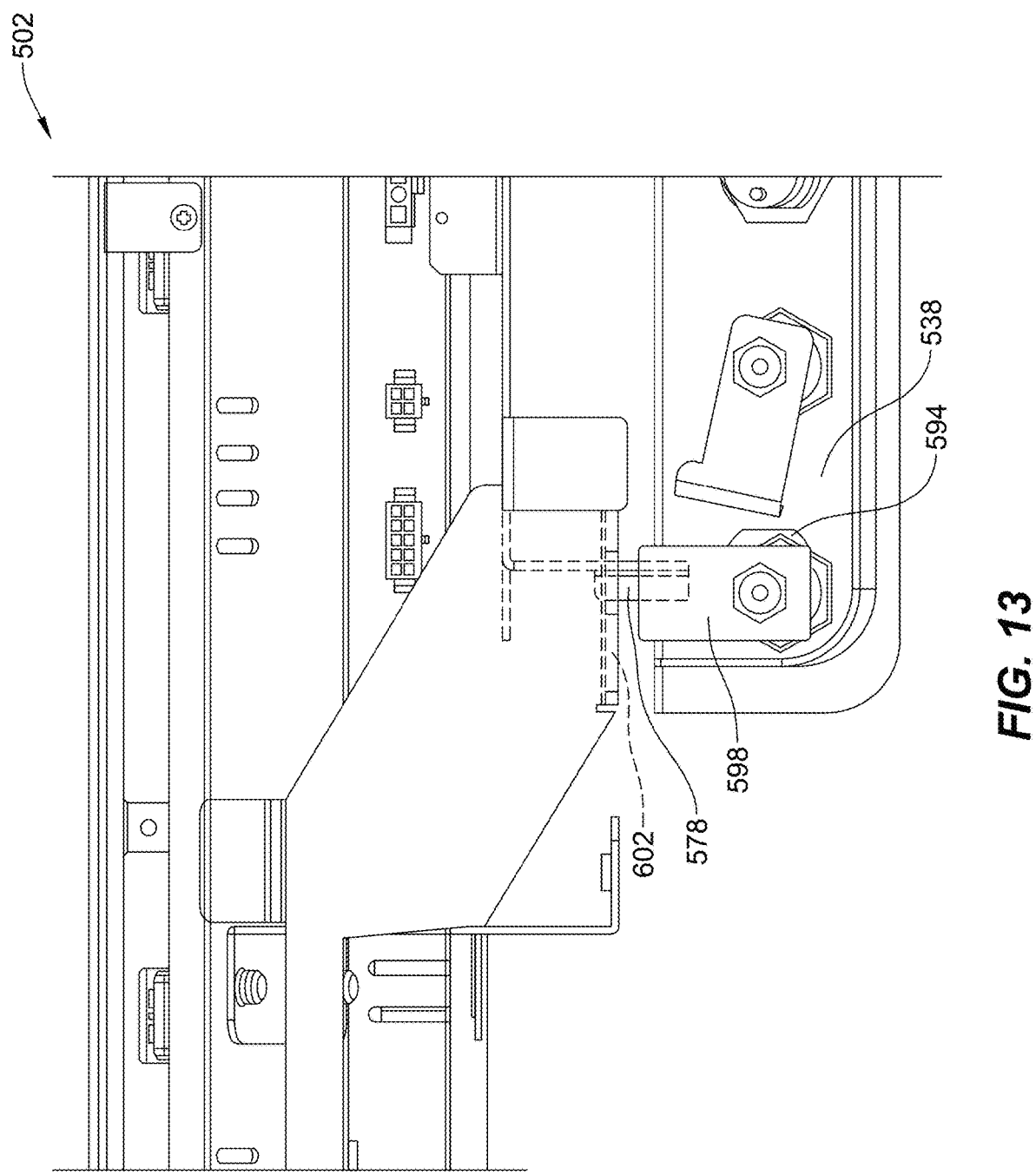
FIG. 13 is a rear view of a portion of the button deck assembly shown in FIG. 4, showing a locking assembly in a locked position.
Figure 14:
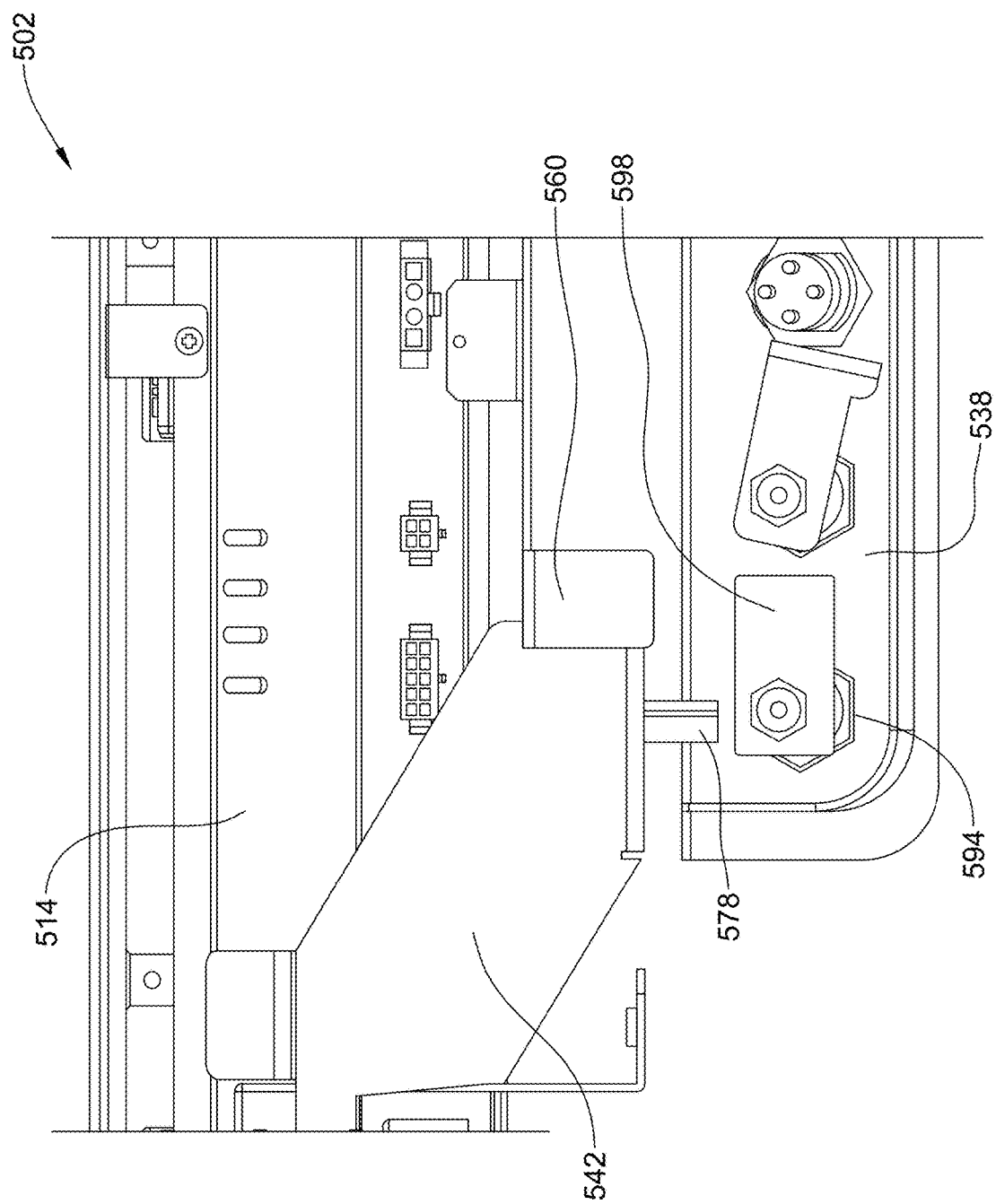
FIG. 14 is a rear view of the portion of the button deck assembly shown in FIG. 13 showing the locking assembly in an unlocked position.

FIG. 11 is a rear perspective view of button deck assembly 502. FIG. 12 is an enlarged view of a portion of button deck assembly 502. FIG. 13 is a rear view of a portion of button deck assembly 502 showing locking assembly 538 in a locked position. FIG. 14 is a rear view of button deck assembly 502 showing locking assembly 538 in an unlocked position.

Referring to FIG. 11 in the example embodiment, locking assembly 538 includes an outer housing 593 coupled to housing 514 and a plurality of cam locks 594 positioned within outer housing 514. A first cam lock 594 includes a rotatable portion 596 and a locking plate 598 coupled to rotatable portion 596 and extending radially outward therefrom. Cam locks 594 are coupled to key holes 600 (shown in FIG. 6) of locking assembly 538 and are configured to rotate therewith. Locking plate 598 is configured to engage foot plate 578 of blocking bar 560 (shown in FIG. 9) when cam lock 594 is in a locked position to facilitate locking blocking bar 560 and lever 542 in position with respect to housing 514. During operation, an operator may move cam lock 594 to an unlocked position (shown in FIG. 14) by inserting a key into a corresponding key hole 600 (shown in FIG. 6) and rotating the key, thereby rotating rotatable portion 596 and locking plate 598 to disengage locking plate 598 with foot plate 578 of blocking bar 560.

Referring to FIG. 12, in the example embodiment, leg 586 of lever 542 defines a leg slot 588 sized to engage at least a portion of blocking bar 560 to facilitate coupling blocking bar 560 to lever 542. More specifically, in the example embodiment, leg 586 includes a boot 602 that defines slot 588. Foot plate 578 of blocking bar 560 is received within slot 588 such that, during operation, when handle 584 (shown in FIG. 9) is moved laterally relative to housing 514, boot 602 engages foot plate 578 of blocking bar 560 to move blocking bar 560 with lever 542.

As shown in FIG. 13, in the example embodiment, foot plate 578 extends laterally below boot 602 to engage locking plate 598 when first cam lock 594 is in the locked position. In alternative embodiments, lever 542 is configured to engage cam lock 594 in any manner that enables button deck assembly 502 to function as described herein. For example, in some embodiments, where button deck assembly 502 does not include blocking bar 560, lever 542 may include a projection (not shown) unitarily formed with lever 542 that engages cam lock 594 when cam lock 594 is in the locked position. Referring to FIG. 14, in the example embodiment, when cam lock 594 is rotated to the unlocked position, locking plate 598 is moved out of engagement with foot plate 578 of blocking bar 560 to facilitate lateral movement (i.e., out of the page in FIG. 14) of lever 542 and blocking bar 560 relative to housing 514.

Exemplary technical effects of the methods, systems, and apparatus described herein include at least one of: (a) facilitating hand operated (i.e., without requiring tools) removal of pushbuttons for servicing, installation, and/or removal; (b) improved ease of access for operators to push button releases; (c) improved life span of EGM and/or button deck by enabling replacement of push buttons; (d) reduced complexity in servicing, installation, and/or removal of push buttons, facilitating a non-technical operator to perform maintenance without technician assistance; (e) reduced overall time required in servicing, installation, and/or removal of push buttons as compared with at least some known push button removal systems.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A button deck assembly for use with a gaming device, the button deck assembly comprising:
a housing;
a pushbutton releasably coupled to the housing by a latch;
a lever coupled to the latch and movable relative to the housing to release the pushbutton; and
a cam lock coupled to the housing, wherein the cam lock is selectively moveable between a locked position, in which the cam lock restricts movement of the lever relative to the housing, and an unlocked position, in which the cam lock is disengaged with the lever and allows movement of the lever relative to the housing for releasing the pushbutton.

2. The button deck assembly of claim 1 further comprising a sliding mechanism comprising a bracket and a rail slidably coupled to the bracket, the bracket configured to be coupled to a cabinet of the gaming device and the rail being coupled to the housing, wherein the housing is moveable along an extension axis relative to the bracket.

3. The button deck assembly of claim 2, wherein the button deck assembly defines a longitudinal axis extending through a first end and a second end of the housing, the first end being oriented to face a cabinet of the gaming device and the second end oriented to face a player at the gaming device, wherein the longitudinal axis is generally parallel to the extension axis.

4. The button deck assembly of claim 1, wherein the cam lock includes a rotatable portion and a locking plate coupled to the rotatable portion and extending radially outward therefrom, wherein the locking plate engages the lever when the cam lock is in the locked position.

5. The button deck assembly of claim 1 further comprising a blocking bar coupled to the lever, wherein the blocking bar engages the cam lock when the cam lock is in the locked position.

6. The button deck assembly of claim 1, wherein the cam lock engages the lever when the cam lock is in the locked position.

7. The button deck assembly of claim 1, wherein the latch is pivotable relative to the pushbutton between a first position, in which the latch engages the pushbutton to secure the pushbutton to the housing, and a second position, in which the latch is disengaged from the pushbutton to remove the pushbutton from the housing.

8. The button deck assembly of claim 1, wherein the lever comprises a handle, the handle being accessible at a position spaced from the housing.

9. The button deck assembly of claim 1, wherein the lever includes an arm that engages the latch, the lever extending from the latch to a handle.

10. The button deck assembly of claim 1, wherein the latch includes a rim and a plug extending transversely relative to the rim, wherein the lever includes an arm that is coupled to the plug.

11. The button deck assembly of claim 1, wherein the pushbutton comprises a first plurality of cam features and the latch comprises a second plurality of cam features corresponding to the first plurality of cam features, the second plurality of cam features being engaged with the first plurality of cam features to secure the pushbutton to the housing when the latch is in a first position, and wherein the second plurality of cam features are disengaged with the first plurality of cam features when the latch is in a second position.

12. An electronic gaming device comprising:
a cabinet; and
a button deck assembly coupled to the cabinet, the button deck assembly comprising:
 a housing;
 a pushbutton coupled to the housing by a latch;
 a lever coupled to the latch and movable relative to the housing; and
 a cam lock, coupled to the housing, wherein the cam lock is selectively moveable between a locked position, in which the cam lock restricts movement of the lever relative to the housing, and an unlocked position, in which the cam lock is disengaged with the lever and allows movement of the lever relative to the housing for releasing the latch and allowing for removal of the pushbutton from the housing.

13. The electronic gaming device of claim 12, wherein the housing is slidably coupled to the cabinet and moveable along an extension axis between a closed position, in which the housing is positioned adjacent the cabinet, and an open position, in which the housing is laterally spaced from the cabinet, wherein the housing contacts the cabinet when the housing is in the closed position.

14. The electronic gaming device of claim 12 further comprising a sliding mechanism comprising a bracket and a rail slidably coupled to the bracket, the bracket being coupled to the cabinet and the rail being coupled to the housing, wherein the housing is moveable along an extension axis relative to the bracket, and wherein the button deck assembly defines a longitudinal axis extending through a first end and a second end of the housing, the first end being oriented to face the cabinet and the second end being oriented to face a player at the gaming device, the longitudinal axis being generally parallel to the extension axis.

15. The electronic gaming device of claim 12, wherein the cam lock includes a rotatable portion and a locking plate coupled to the rotatable portion and extending radially outward therefrom, wherein the locking plate engages the lever when the cam lock is in the locked position.

16. The electronic gaming device of claim 12 further comprising a blocking bar coupled to the lever, wherein the blocking bar engages the cam lock when the cam lock is in the locked position.

17. The electronic gaming device of claim 12, wherein the housing is slidably coupled to the cabinet and moveable along an extension axis between a closed position, in which the housing is positioned adjacent the cabinet, and an open position, in which the housing is laterally spaced from the cabinet, and wherein the lever comprises a handle, the handle being positioned between the housing and the cabinet when the housing is in the open position.

18. A button deck assembly for use with an electronic gaming machine having a cabinet, the button deck assembly comprising:
 a sliding mechanism comprising a bracket and a rail slidably coupled to the bracket, the bracket configured to be coupled to the cabinet;
 a housing coupled to the rail and extending from a first end to an opposed second end, the housing moveable along an extension axis relative to the bracket;
 a pushbutton releasably coupled to the housing by a latched;
 a lever coupled to the latch and movable relative to the housing to release the pushbutton; and
 a cam lock coupled to the housing, wherein the cam lock is selectively moveable between a locked position, in which the cam lock restricts movement of the lever relative to the housing, and an unlocked position, in which the cam lock is disengaged with the lever and allows movement of the lever relative to the housing for releasing the pushbutton.

19. The button deck assembly of claim 18, wherein the button deck assembly defines a longitudinal axis extending through the first end and the second end of the housing, the first end being oriented to face the cabinet and the second end oriented to face a player at the gaming machine, wherein the longitudinal axis is generally parallel to the extension axis.

20. The button deck assembly of claim 18, wherein the cam lock includes a rotatable portion and a locking plate coupled to the rotatable portion and extending radially outward therefrom, wherein the locking plate engages the lever when the cam lock is in the locked position.

\* \* \* \* \*